(12) United States Patent
Tarris et al.

(10) Patent No.: US 6,434,852 B1
(45) Date of Patent: Aug. 20, 2002

(54) TOOL GAUGE

(75) Inventors: Wayne A. Tarris; Ronald Farrar, both of Medford, OR (US)

(73) Assignee: Pacific Rack & Machine, LLC, White City, OR (US)

( * ) Notice: Subject to any disclaimer, the term of this patent is extended or adjusted under 35 U.S.C. 154(b) by 0 days.

(21) Appl. No.: 09/501,060

(22) Filed: Feb. 9, 2000

(51) Int. Cl.[7] ............................................... B27G 23/00
(52) U.S. Cl. .............................. 33/640; 33/613; 33/628
(58) Field of Search ........................... 33/340, 534, 613, 33/626, 628, 633, 636, 638, 640, 641, 645, 562

(56) References Cited

U.S. PATENT DOCUMENTS

| | | | |
|---|---|---|---|
| 2,451,733 A | * 10/1948 | Hochwarder | ................. 33/613 |
| 3,098,305 A | * 7/1963 | Anderson | ..................... 33/534 |
| 3,201,873 A | * 8/1965 | Bell et al. | ..................... 33/562 |
| 3,205,586 A | 9/1965 | Mullen | |
| 4,519,142 A | * 5/1985 | Parker | ......................... 33/628 |
| 4,584,774 A | * 4/1986 | Link | ........................... 33/202 |
| 4,754,276 A | 6/1988 | Carlson et al. | |
| 4,779,354 A | * 10/1988 | Hill | .............................. 33/640 |
| 4,826,370 A | * 5/1989 | Conradsson | ................. 33/638 |
| 5,168,637 A | 12/1992 | Gibson | |
| 5,934,973 A | 8/1999 | Boucher et al. | |

* cited by examiner

Primary Examiner—Christopher W. Fulton
(74) Attorney, Agent, or Firm—Chernoff, Vilhauer, McClung & Stenzel, LLP

(57) ABSTRACT

An inexpensive and easily used gauge for accurately gauging the position of a tool is described. The gauge includes at least one fixed or adjustable gauging reference positioned relative to the table or other work locating datum of the power tool. The gauging reference has a conductive surface to be brought into contact with the working element of the tool. A gauge for measuring the angle of a tool is also described with a gauging reference that contacts the tool in a plane parallel to the plane of motion of the working elements of the tool. An LED and battery are connected in series and to the gauging reference and to a second contact node. The second node of the normally open circuit is insulated from the gauging reference but arranged for contact with a conductive path to the working elements of the tool. When the gauging reference and the contact are in conductive engagement with the tool an LED emits light indicating that the working element of the tool is in the correct position.

1 Claim, 4 Drawing Sheets

TOOL GAUGE

BACKGROUND OF THE INVENTION

The present invention relates to a gauge for gauging the position of the working elements of a movable tool of a power tool.

Power tools, such as table saws, radial arm saws, routers, milling machines, and drill presses include a mechanism for adjusting the depth and, often, the angle of the cut or other alteration of the work produced by the tool. The adjustment mechanism changes the position or plane of operation of a working element of the tool (such as the cutting edge of a tooth) relative to a locating datum that positions the work. The adjustment mechanism may include an indicator of the height or angle of the working elements of the tool relative to the machine's table or other work locating datum. However, some power tools do not include such an indicator. Further, slack or wear in the adjustment mechanism and variations in the tool size or depth of insertion in the tool holder often make the reliability and accuracy of these built-in tool position indicators suspect. Therefore, despite the presence of built-in tool position indicators, power tool users often check the position of a working element of the tool by direct measurement. However, parallax and the arrangement of the elements of the power tool often make accurate measurement with a ruler or other measuring device difficult.

For greater accuracy and convenience, gauges have been developed that are supported by the table or work locating datum of the power tool and directly contact the working element of the tool. Gibson, U.S. Pat. No. 5,168,637; discloses a measuring device with a vertically movable head mounted on a column. The base of the column is placed on the table of a saw and the head is brought into contact with a tooth of the saw blade. The distance between the cutting edge of the tooth and the table is read from a scale attached to the column. Such an infinitely adjustable measuring device can be quite accurate if the moving parts of the gauge fit well and if the scale gradations are small. However, the close manufacturing tolerances and substantial structure required for accurate gauging can result in an expensive gauge and the structure of the gauge may interfere with machine elements, especially when the machine has an over-the-work structure. Often only a limited number of discrete, accurate gauging positions are sufficient for machine set up making a precision, infinitely adjustable gauge an unnecessary expense. Further, determining when the working element has contacted the gauging reference requires careful continuous inspection of the gauging reference or the area of contact of the gauge base with the machine tool.

A gauge providing a single, fixed gauging reference is disclosed by Boucher et al., in U.S. Pat. No. 5,934,973. This gauge is attached to the side of the table of a wafer cutting saw and gauges the minimum acceptable distance between the table and the cutting elements of the saw blade. When the saw blade contacts the top of the gauge, a piezoelectric switch is deflected producing an electrical signal. The signal is used to alert the machine operator that the saw blade has reached the minimum desired working height above the table. While a gauge with single gauging reference attached to a power tool is acceptable for a singular use in a production environment, it is not particularly useful in setting up a number of power tools in a shop. The gauge includes a convenient indicator of tool position. However, the accuracy of the gauge is subject to the amount and consistency of deflection of the gauging reference required to actuate the signaling device. This gauge utilizes an expensive piezoelectric switch to achieve the consistency of gauging reference deflection required for accurate measurement.

What is desired, therefore, is an inexpensive and easily used gauge for accurately gauging the relative position of a working element of a tool relative to the work locating datum of a power tool.

SUMMARY OF THE INVENTION

The present invention overcomes the aforementioned drawbacks of the prior art by providing a gauge for gauging a relative position of a working element and a locating datum of a power tool comprising a conductive gauge reference arranged for selective engagement with the working element at a spaced relation to the locating datum; a contact insulated from the gauge reference and arranged for conductive engagement with the working element; and an indicator of conduction between said gauge reference and said contact. An LED provides a clear indication to the user that the working element of the tool is in contact with the gauging reference and, therefore, adjusted to the desired position. The LED is part of a simple open circuit that is closed by conductive engagement between the tool, through the conductive gauge reference, and a second electrical terminal of the open circuit. The gauge is of inexpensive construction and can include a plurality of fixed gauging references or adjustable gauging references. The gauge can be used with a number of power tools.

A gauge is also provided for gauging the angular position of the working element of a tool relative to a locating datum comprising a conductive gauge reference in spaced relation to the locating datum and arranged for selective engagement with the tool in a plane parallel to the plane of operation of the working elements of the tool; a contact insulated from the gauge reference and arranged for conductive engagement with the tool; and an indicator of conduction between the gauge reference and the contact.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Generally, a power tool includes a work surface or locating datum that supports the work or, in the case of a hand tool, supports the power tool during use. The locating datum of a table saw, milling machine, or radial arm saw is the power tool's table. For a hand-held router or power saw the locating datum is the base that supports the power tool as it is moved over the work. The depth or angle of the cut resulting from operation of the power tool is determined by the position of the working elements of the tool relative to the work surface or locating datum. The working element of the tool may be a flute of a drill bit or the cutting surface of a tooth of a saw blade, milling cutter, or router bit. While power tools are commonly used for cutting, the working element could be a surface of a tool that alters the work by a process other than cutting.

Figure 1:
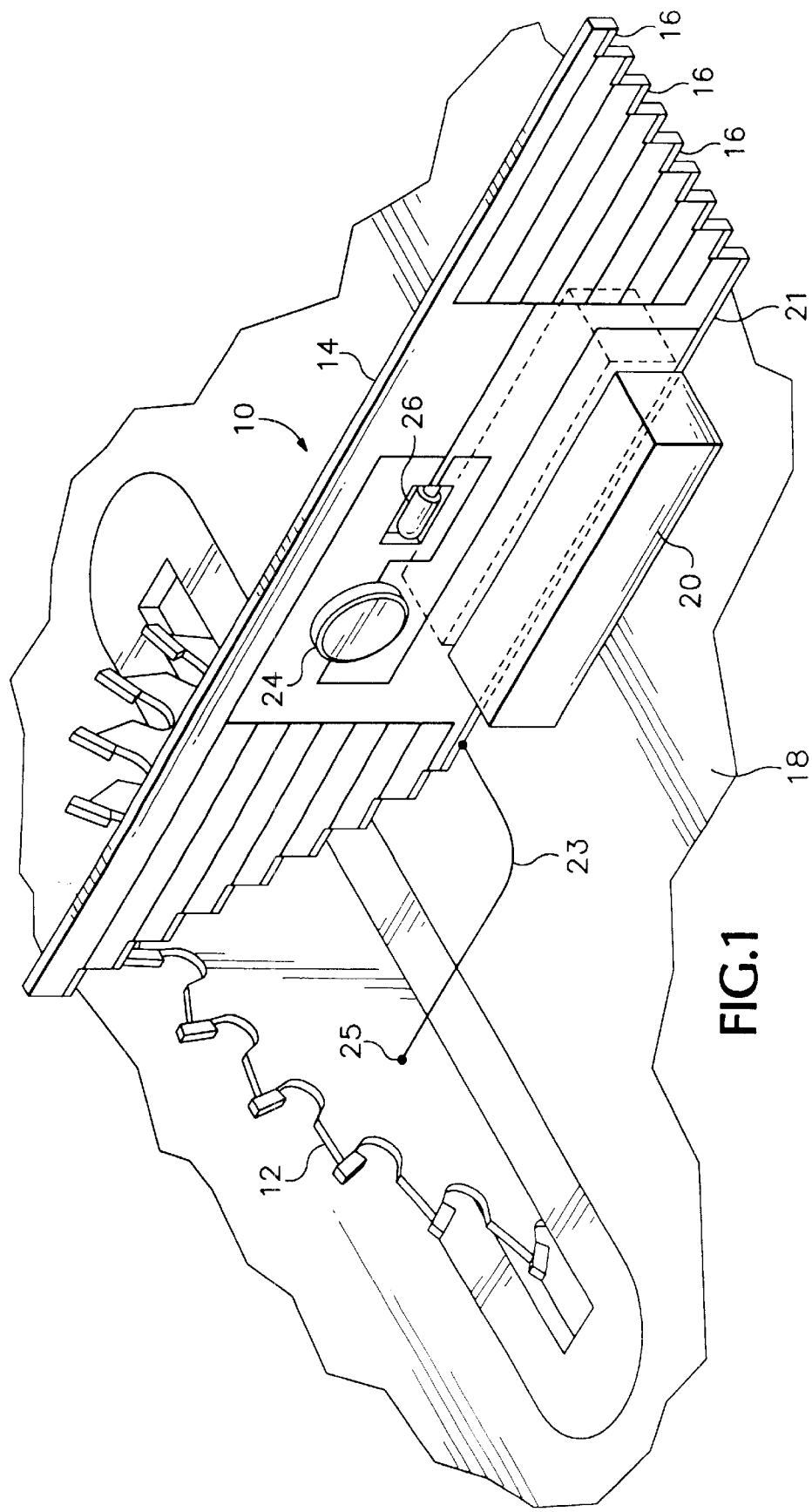
FIG. 1 is a perspective view of a gauge of the present invention illustrating use of the gauge to gauge the cutting depth of a table saw.

Referring to FIG. 1, a first embodiment of the gauge 10 of the present invention is particularly useful for setting the working depth of a tool such as a blade 12 of a table saw. The gauge 10 comprises a gauge body 14 defining a plurality of fixed gauging references given the reference numeral 16 arranged in a plurality of spaced relations to a surface of the gauge in contact with the table or work locating datum 18. The body 14 of the gauge 10 is mounted on a base 20 for stable support on the table 18. The base may incorporate magnets (not shown) for convenient positioning of the gauge 10 on an iron or steel table commonly used on a table saw or milling machine. Each gauging reference 16 is faced with a conductor which is insulated from the conductors on all the other gauging references 16 by the insulating body 14. The body 14 also includes provisions for mounting a battery 24 and a transducer, such as a light emitting diode LED 26.

Figure 2:
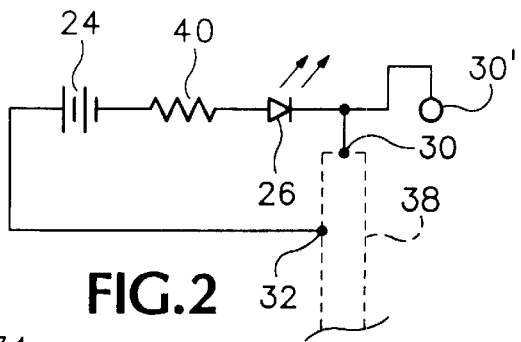
FIG. 2 is a schematic diagram of a conduction indicator circuit for a gauge.

Referring to FIG. 2, the battery 24 and the LED 26 are connected as series elements in a plurality of normally open electrical circuits that terminate in a pair of nodes 30, 30', and 32 arranged for selective engagement with the tool of the power tool. The battery 24 may be connected to the LED 26 through a load resistor 40 if necessary to reduce the voltage to the LED 26. The node 30 is formed by the conductive surface of the gauging reference 16. Node 30' represents the conductive surface of another gauging reference 16 and is part of an additional circuit in parallel with the circuit formed by node 30. The node 30 is arranged to contact the tool 38 when the working element of the tool is in the desired gauging position. The second node or contact 32 is arranged for engagement with a conductive path through the tool when the tool's working element is in proper contact with the gauging reference 16. This closes the circuit through the conductive tool 38 and current flows the through LED 26. The LED 26 will emit light indicating adjustment of the tool to the gauging reference 16. While an LED 26 is a convenient indicator of conduction in the circuit, other types of transducers emitting light, sound or another signal could be used. Printed circuit board techniques are useful in inexpensively producing the conductive surfaces of the gauging references 16 and the necessary circuit traces of the indicator circuit on an insulating gauge body 14.

Figure 4:
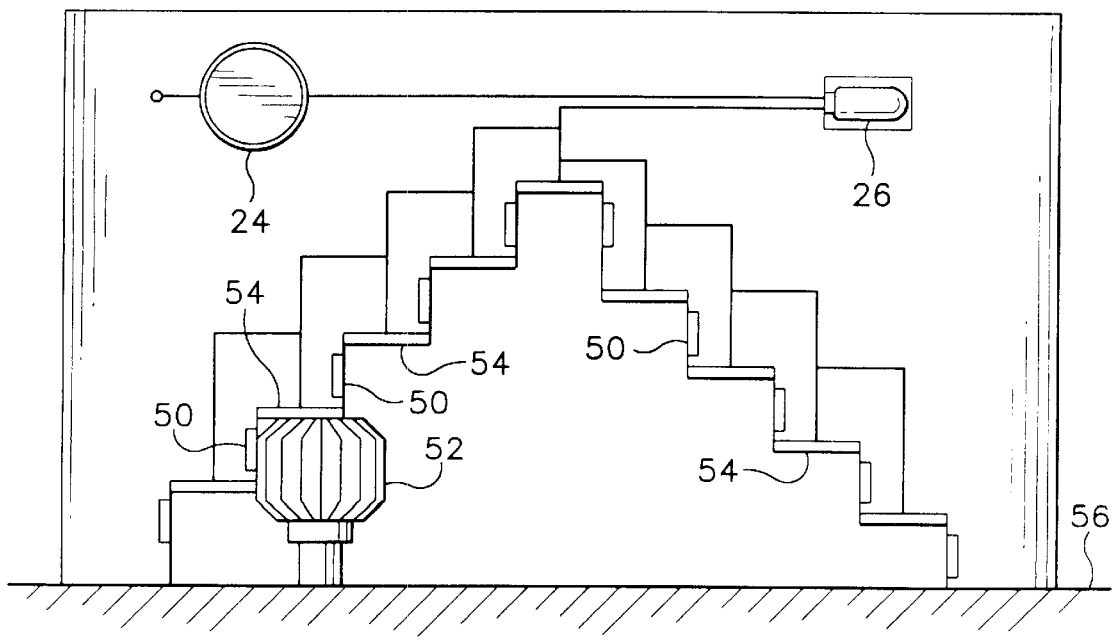
FIG. 4 is an elevation view of a compact embodiment of the gauge illustrating its use in gauging the position of a tool that projects from beneath the locating datum.

Referring again to FIG. 1, for a power tool with a conductive table or locating datum 18, the contact node 32 of the open circuit can be implemented by terminating the circuit in a conductive contact 21 with the table 18. Generally, an electrically conductive path exists between the tool and the table of power tools such as table saws and milling machines. However, the table or locating datum may be constructed of or covered by an insulator or the tool may be electrically insulated from the locating datum by some other means. The wooden table of a radial arm saw or the plastic base of a router are examples of power tools having tools electrically insulated from the locating datum. For power tools of this construction the contact 32 of the indicator circuit can be provided by a wire 23 with a clip or magnet 25 to attach to the wire to the tool 12. An alternative structure for providing a second contact with the tool is illustrated in FIG. 4. In this alternative, the surface of the body 50 orthogonal to the gauging reference 54 is clad with a conductor. When the tool 52 is brought into contact with the gauging reference 54 and the orthogonal surface of the body 50, the indicator circuit is closed causing the LED 26 to illuminate.

Figure 3:
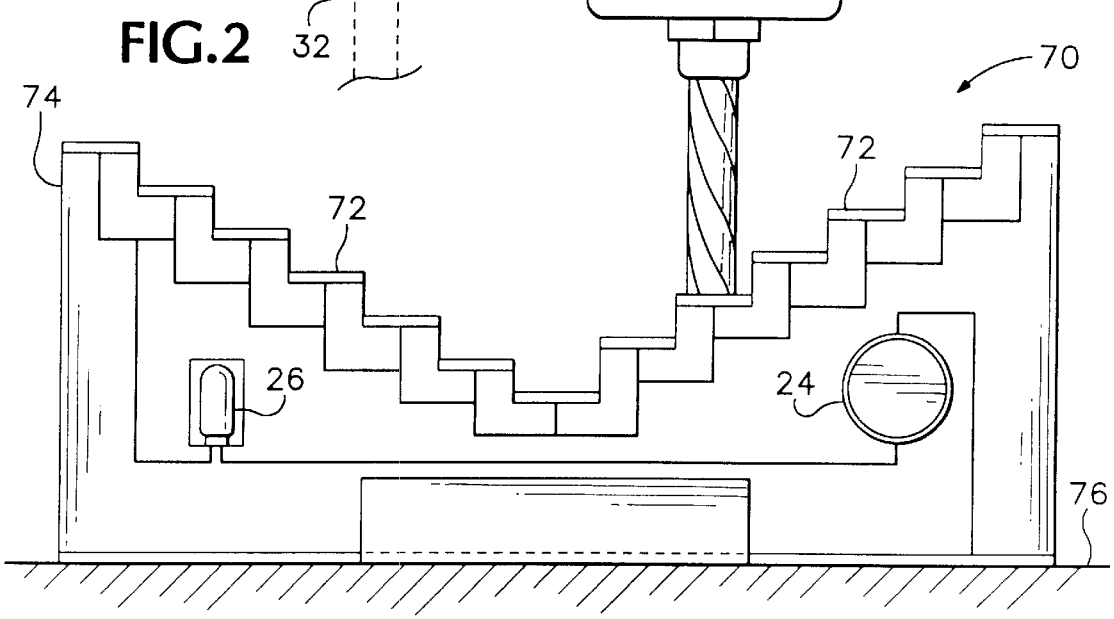
FIG. 3 is an elevation view of a compact embodiment of the gauge illustrating use for gauging the position of a tool suspended above the work locating datum.

The gauge of FIG. 1 is particularly useful for table saws or other power tools having relatively large tables with a tool projecting from below the table. FIG. 3 illustrates a compact second embodiment of the gauge 70 having gauging references 72 located interior to the body 74 rather than along the periphery of the body 10, as illustrated in FIG. 1. This embodiment of the gauge 70 is useful for gauging the location of tools that are suspended above the locating datum 76. Examples of power tools of this construction are the radial arm saw, drill press, and milling machine. The compact second embodiment is particularly useful in adjusting the cutting height of a power tool having a relatively small locating datum such as the base of a router or hand-held saw. As illustrated in FIG. 4, the gauge can be inverted for use with saws, routers, and other machines having tools projecting upward through the locating datum 56.

Figure 5:
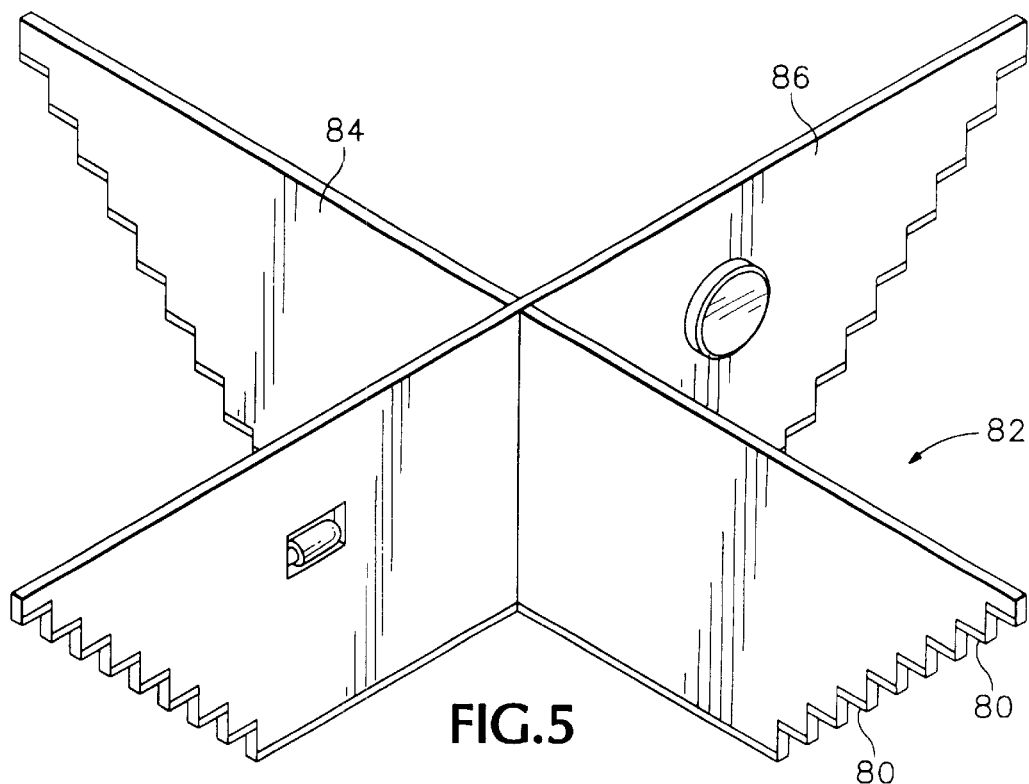
FIG. 5 is a perspective view of a gauge having a plurality of body elements.
Figure 6:
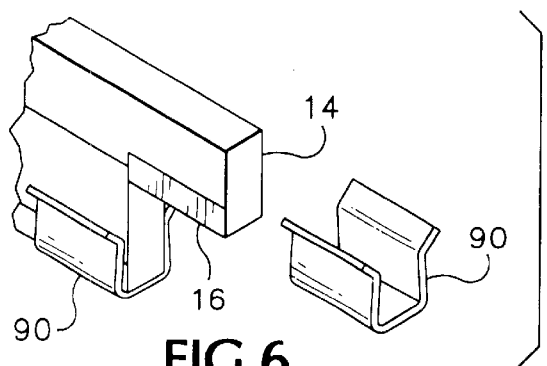
FIG. 6 is a fragmentary view of a gauge body illustrating a metal shim that can be clipped to a gauge body to increase the number of gauging references available in a single gauge.

The gauge of the present invention provides a limited number of discrete gauging references. Referring to FIG. 5, the number of gauging references 80 of a gauge assembly 82 can be increased by incorporating more than one gauge body 84 and 86, each having a unique set of gauging references. Referring to FIG. 6, the selection of gauging references 16 available in a single gauge can also be increased by attaching a conductive shim of known thickness to the surface of the gauging reference 16. Such a shim can be incorporated as a metal clip 90 which is held in position by friction between the gauge body 14 and the clip 90.

Figure 7:
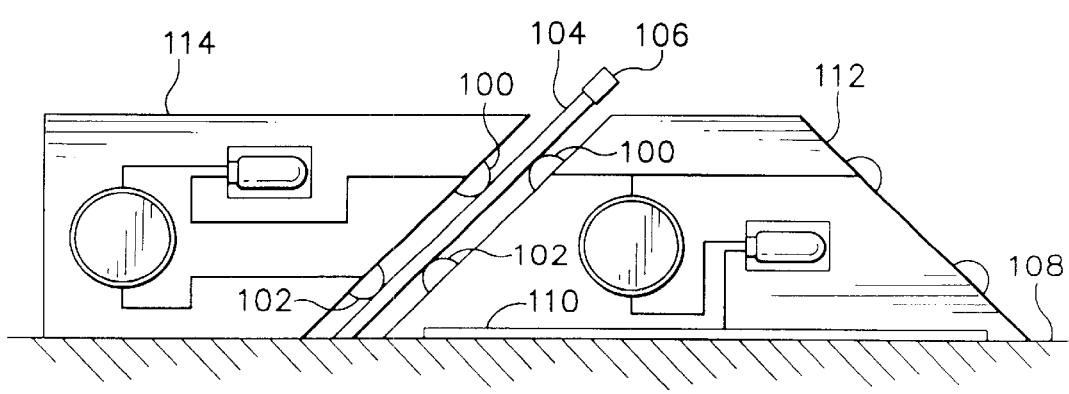
FIG. 7 is an elevation view of inside and outside angle gauges.

Gauges according to the present invention are also useful for adjusting a tool for an angled cut. Referring to FIG. 7, a gauging reference comprising first 100 and second 102 contacts are arranged to contact the tool 104 in the plane of action of the working element 106 when the tool 104 is at the correct angle to the locating datum 108. Both contacts 100 and 102 can be conductive or the second conductive contact 110 can be provided through the locating datum 108. As illustrated, the gauge 112 can be used to gauge interior angles or, as illustrated by gauge 114, to gauge exterior angles.

Figure 8:
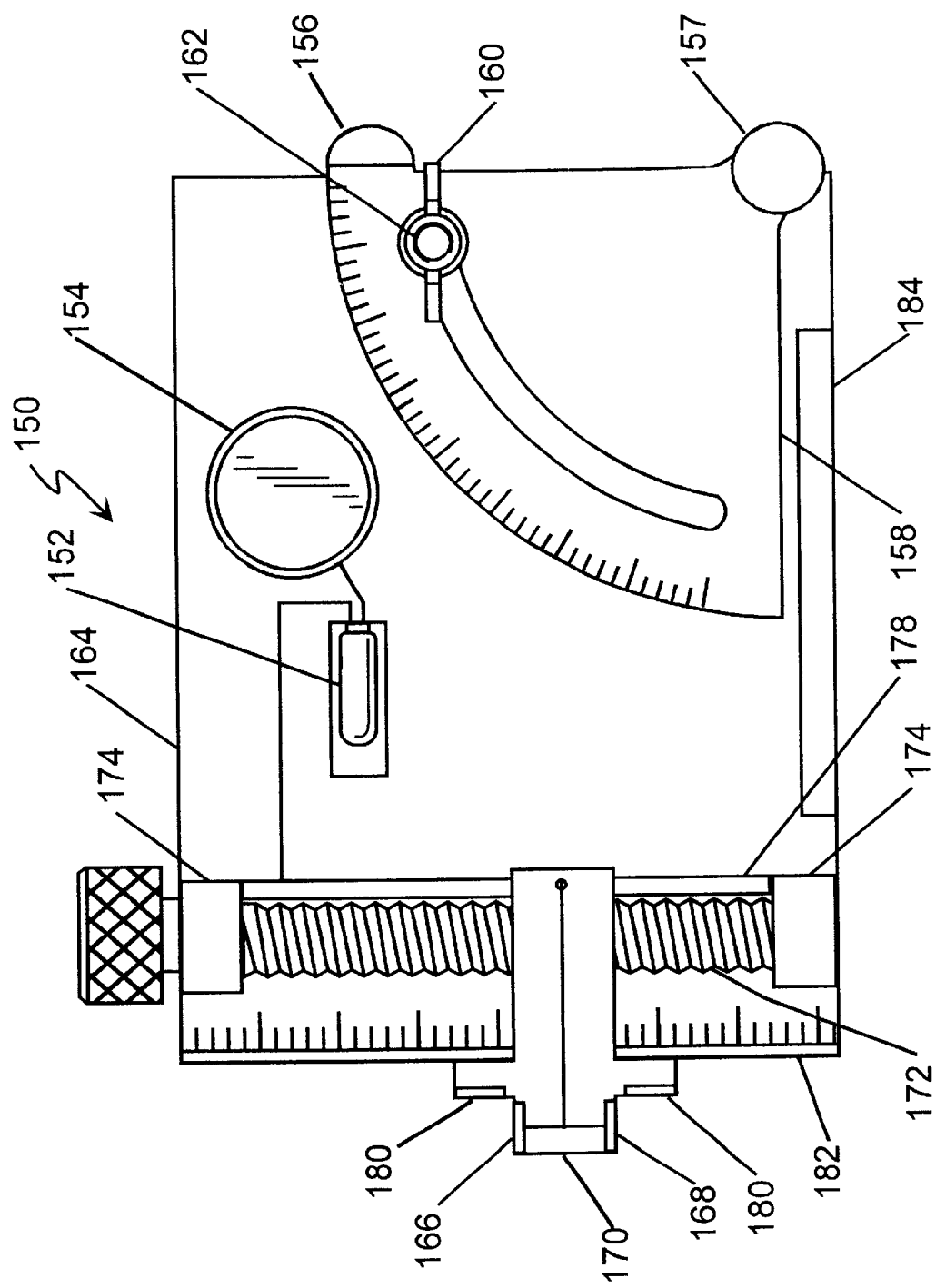
FIG. 8 is an elevation view of a gauge with adjustable vertical and angle gauging references.

Referring to FIG. 8, another aspect of the present invention provides a gauge with adjustable gauging references. The gauge 150 includes adjustable gauging references for gauging both the vertical and angular positions of tools. Contact of the tool with the gauging references is indicated by illumination of a LED 152 that draws power from a battery 154. The angular position of the tool is gauged by contact with the tool at the conductive gauging reference 156 and second node 157. The adjustable gauging reference 156 is attached to a movable sector 158 that pivots about the second node 157. The angular position of the movable sector 158 is maintained by a friction lock such as a wing nut 160 engaging a threaded stud 162 in the body 164 of the gauge 150. The angular position of the adjustable gauging reference 156 can be altered by releasing the friction lock and rotating the movable sector 158. When the movable gauging reference 156 and the second node 157 are brought into contact with a conductive tool, the LED 152 is illuminated. Contact with the tool in a plane parallel to the working elements of the tool gauges adjustment of the angular position of the working elements relative to the work locating datum. Vertically adjustable gauging references 166 and 168 are provided to gauge the vertical position of a tool. The position of a tool suspended above the work datum can be gauged with the upper vertical gauging reference 166 and the position of tools supported from below the locating datum can be gauged by the lower gauging reference 168. The vertical gauging references 166 and 168 are attached to an insulating carriage 170 that is moved vertically by rotation of a screw 172. The screw 172 is rotatably attached to the gauge body 164 at journals 174. The upper 166 and lower 168 vertically adjustable gauging references are electrically connected in parallel and conductively connected to a first conductive strip 178 on the gauge body 164. The first conductive strip is connected through the LED 152 to a terminal of the battery 154. The second nodes 180 of the open indicator circuit are formed by conductive areas on surfaces of the carriage 170 that are orthogonal to the upper 166 and lower 168 gauging references. The conductive second nodes 180 are connected in parallel and electrically connected (connections not illustrated) to a second conductive strip 182 on the gauge body 164 which is electrically connected to the battery 154. When the tool is brought into simultaneous contact with either of the upper 166 or lower 168 gauging references and one of the second nodes 180 the circuit through the LED 152 is closed and the LED 152 is illuminated. The gauge also includes a magnetic base 184 for convenient use on iron tables. The base 184 is electrically connected to the second nodes 180 to provide a convenient alternative second node for the indicator circuit.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A gauge for gauging a relative position of a conductive work element of a tool and a locating datum comprising:

(a) a gauge body having a first surface arranged for selective engagement with said locating datum and a conductive second surface in spaced relation to said first surface and arranged for selective engagement with said working element;

(b) a contact insulated from said second conductive surface and arranged for selective conductive engagement with said working element;

(c) a source of electrical current;

(d) a transducer to signal conduction of said electrical current through said working element between said second conductive surface and said contact; and (e) a conductive shim arranged for selective engagement with said second conductive surface.

* * * * *